(12) United States Patent
Wang et al.

(10) Patent No.: US 10,209,793 B2
(45) Date of Patent: Feb. 19, 2019

(54) TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Lei Wang, Beijing (CN); Xiaochuan Chen, Beijing (CN); Hailin Xue, Beijing (CN); Haisheng Wang, Beijing (CN); Zhiying Bao, Beijing (CN); Zhenhua Lv, Beijing (CN); Shengji Yang, Beijing (CN); Yingming Liu, Beijing (CN); Shijun Wang, Beijing (CN); Yue Li, Beijing (CN); Xiaoliang Ding, Beijing (CN); Yanna Xue, Beijing (CN); Hongjuan Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 248 days.

(21) Appl. No.: 15/208,363

(22) Filed: Jul. 12, 2016

(65) Prior Publication Data
US 2017/0102795 A1 Apr. 13, 2017

(30) Foreign Application Priority Data
Oct. 12, 2015 (CN) .......................... 2015 1 0657320

(51) Int. Cl.
*G06F 3/041* (2006.01)
*G09G 3/20* (2006.01)
*G02F 1/1333* (2006.01)

(52) U.S. Cl.
CPC .......... *G06F 3/041* (2013.01); *G02F 1/13338* (2013.01); *G06F 3/0416* (2013.01); *G09G 3/20* (2013.01)

(58) Field of Classification Search
CPC .... G02F 1/13338; G06F 3/041; G06F 3/0416; G09G 3/20
See application file for complete search history.

(56) References Cited

U.S. PATENT DOCUMENTS

2015/0042578 A1 2/2015 Nagai
2016/0147325 A1* 5/2016 Tai .......................... G06F 3/041
                                                  345/173

FOREIGN PATENT DOCUMENTS

CN       104598074 A      5/2015
CN       104635981 A      5/2015

OTHER PUBLICATIONS

Second Chinese Office Action, for Chinese Patent Application No. 201510657320.9, dated Sep. 30, 2017, 10 pages.
(Continued)

*Primary Examiner* — Viet D Pham
(74) *Attorney, Agent, or Firm* — Kinney & Lange, P.A.

(57) ABSTRACT

The embodiments of the present application relate to the technical field of touch display device, and disclose a touch display device, including a touch display panel and a control unit arranged on a side of the touch display panel, with a first wiring area being arranged between the touch display panel and the control unit; wherein a plurality of data connection lines and a plurality of touch connection lines are led out of a side edge of the touch display panel, the plurality of data connection lines being connected with a plurality of data pins on the control unit in a one-to-one correspondence manner, while the plurality of touch connection lines being connected with a plurality of touch pins on the control unit in a one-to-one correspondence manner; and wherein within
(Continued)

the first wiring area, the plurality of data connection lines are divided into two wiring layers, the plurality of touch connection lines being arranged at least in layer in which one wiring layer of the data connection lines are located. According to the above technical scheme, by arranging the data connection lines in a layering manner, a bezel width occupied by the data connection lines is reduced, and influence of the data connection lines on the bezel width is in turn reduced, facilitating development of the slim bezel of the touch display device.

7 Claims, 5 Drawing Sheets

(56) References Cited

OTHER PUBLICATIONS

First Chinese Office Action, for Chinese Patent Application No. 201510657320.9, dated Aug. 2, 2017, 13 pages.

\* cited by examiner

TOUCH DISPLAY DEVICE

CROSS-REFERENCE TO RELATED APPLICATION

The present application claims the benefit of Chinese Patent Application No. 201510657320.9 filed on Oct. 12, 2015 in the State Intellectual Property Office of China, the whole disclosure of which is incorporated herein by reference.

BACKGROUND OF THE INVENTION

Field of the Invention

Embodiments of the present application relate to the technical field of touch display technology, and in particular, to a touch display device.

Description of the Related Art

Figure 1:
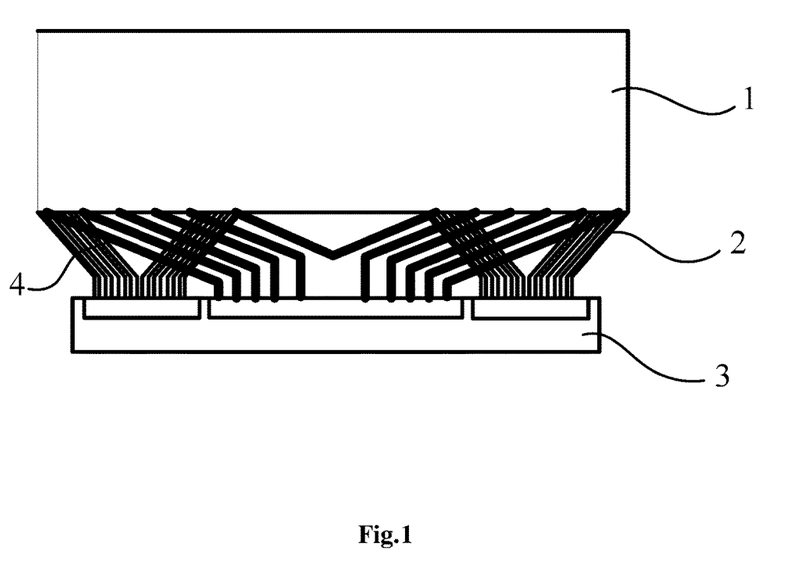
FIG. 1 is a schematic view illustrating a conducting wire set of a touch display device in the prior art.

A major of current self-capacitance designs use a design scheme having an additional mask, i.e., by adding a metallic layer to form a touch pattern on the basis of conventional display screen. In addition to considering the influence of incorporation of such metallic layer, e.g., onto aperture ratio, within a display zone, external pin space should also be considered in emphasis. However, an output capacity may be influenced due to incorporation of a new pattern layer. In the prior art, data lines are typically arranged in a wiring layer while touch lines are arranged in another wiring layer. Taking a 5-inch panel for example, in a lower pad of a conventional display screen, e.g., a distance between the touch display panel and an edge of TFT glass is about 5.5 mm. Due to the use of aforementioned wiring mode, a bezel width can be increased to about 6.8 mm, even if a line-thinning technology is adopted. As illustrated in FIG. 1, data connection lines 4 and touch connection lines 2 are arranged between the touch display panel 1 and the control unit 3; and it can be known from FIG. 1 that, more connection lines may further enlarge a distance between the touch display panel 1 and the control unit 3, i.e., it is necessary for the bezel to be configured to correspond to a larger bezel width, which fails to meet mainstream requirement of market and thus has no competitiveness.

SUMMARY OF THE INVENTION

The present application has been made to overcome or alleviate at least one aspect of the above mentioned disadvantages and/or shortcomings in the prior art. One main object of the exemplary embodiment of the present application is to provide a touch display device for decreasing a bezel width of the touch display device so as to facilitate development of a slim bezel of the touch display device.

Following technical solutions are adopted in the exemplary embodiments of the application for achieving above desired technical purposes.

According to an aspect of the exemplary embodiment of the present application, there is provided a touch display device, comprising a touch display panel and a control unit arranged on a side of the touch display panel, a first wiring area being arranged between the touch display panel and the control unit; a plurality of data connection lines and a plurality of touch connection lines are led out of a side edge of the touch display panel, the plurality of data connection lines being connected with a plurality of data pins of the control unit in a one-to-one correspondence manner, the plurality of touch connection lines being connected with a plurality of touch pins of the control unit in a one-to-one correspondence manner; and within the first wiring area, the plurality of data connection lines are arranged in two wiring layers, the plurality of touch connection lines being arranged at least in the same layer in which one wiring layer of the two wiring layers of the data connection lines is located.

BRIEF DESCRIPTION OF THE DRAWINGS

The above and other features and advantages of the present application will become more apparent and a more comprehensive understanding of the present application can be obtained, by describing in detail exemplary embodiments thereof with reference to the accompanying drawings, in which.

DETAILED DESCRIPTION OF PREFERRED EMBODIMENTS OF THE INVENTION

In order to decrease the bezel width of the touch display device, for facilitating development of slim bezel of a touch display device, a touch display device is provided by exemplary embodiments of the application. In a solution of the exemplary embodiments, by arranging data connection lines in a layering manner, and by arranging touch connection lines at least in a same layer in which one wiring layer of the data connection lines are located, the influence of the data lines onto the bezel width of the touch display device may be decreased and thus the bezel width of the touch display device may also be reduced, facilitating development of a slim bezel of the touch display device.

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the application in view of attached drawings should not be construed as being limited to the embodiment set forth herein; rather, these embodiments are provided so that the present disclosure will be thorough and complete, and will fully convey the general concept of the disclosure to those skilled in the art.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Respective dimension and shape of each layer in the drawings are only intended to exemplarily illustrate the contents of the disclosure, rather than to demonstrate the practical dimension or proportion of components of the touch display device.

Figure 2:
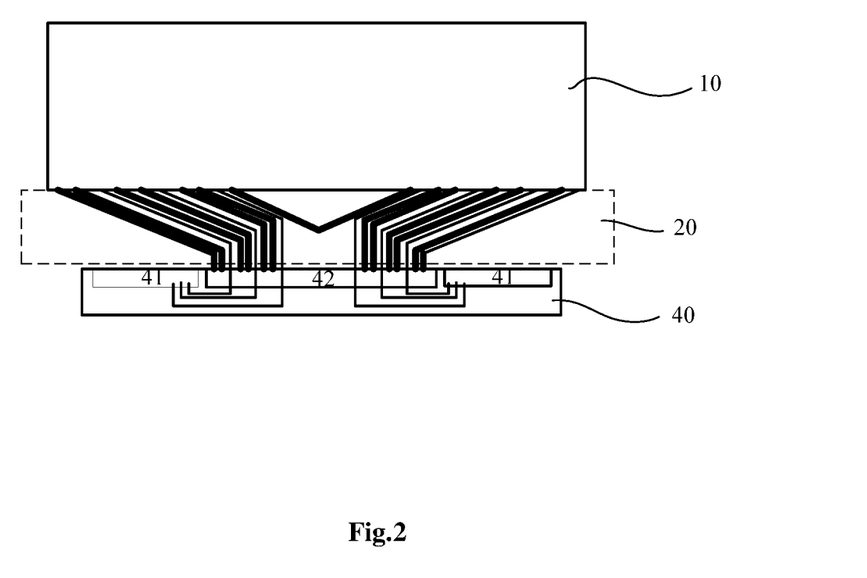
FIG. 2 is a schematic view illustrating a conducting wire set of a touch display device provided by an exemplary embodiment of the application.
Figure 3:
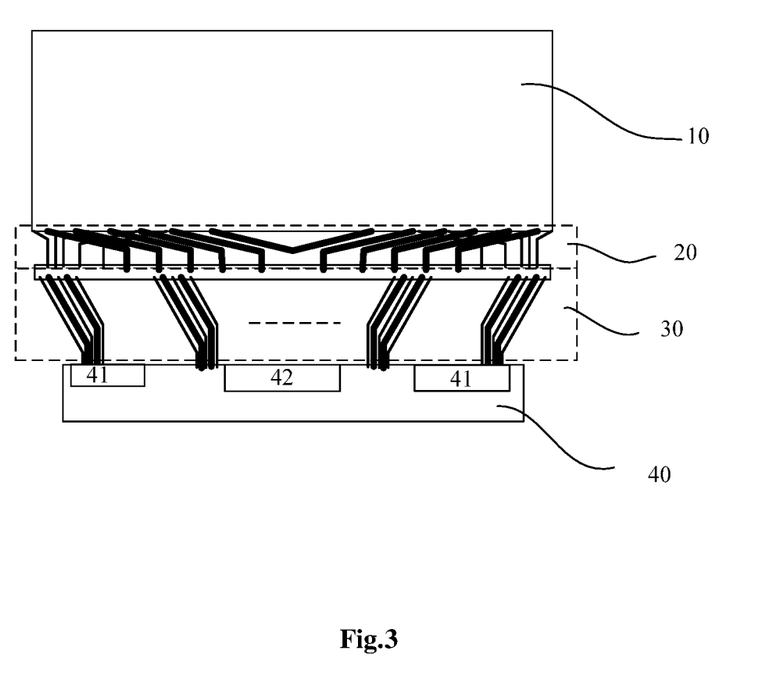
FIG. 3 is a schematic view illustrating another conducting wire set of a touch display device provided by an exemplary embodiment of the application.

As illustrated in FIG. 2 and FIG. 3, different configurations of the touch display device provided by exemplary embodiments of the application are shown.

Firstly, it should be noticed that, as illustrated in FIGS. 2 and 3 of the exemplary embodiments of the invention, among the connection lines between a touch display panel 10 and a control unit 40, thick lines and thin lines indicate that these connection lines are not arranged in the same layer, i.e., these connection lines are arranged in a layering manner.

According to a general technical concept of the present application, a touch display device is provided by an exemplary embodiment of the application, comprising a touch display panel 10 and a control unit 40 arranged on a side of the touch display panel 10, with at least a first wiring area 30 being arranged between the touch display panel 10 and the control unit 40; wherein a plurality of data connection lines and a plurality of touch connection lines are led out of a side edge of the touch display panel 10, which side edge faces towards the control unit 40, and the plurality of data connection lines converge towards a plurality of data pins 42 on the control unit 40 from the side edge of the touch display panel 10 and are connected with the data pins 42 in a one-to-one correspondence manner, while the plurality of touch connection lines converge towards a plurality of touch pins 41 on the control unit 40 from the side edge of the touch display panel 10 and are connected with the touch pins 41 in a one-to-one correspondence manner; and within the first wiring area 30, the plurality of data connection lines are divided into two wiring layers, the plurality of touch connection lines being arranged at least in the same layer in which one wiring layer of the data connection lines are located.

In above technical solution, by arranging data connection lines in a layering manner, and by arranging touch connection lines at least in the same layer in which one wiring layer of the data connection lines are located, the bezel width occupied by the data connection lines is reduced, and influence of the data connection lines onto the bezel width of the touch display device is in turn decreased, facilitating development of a slim bezel of the touch display device.

Figure 4:
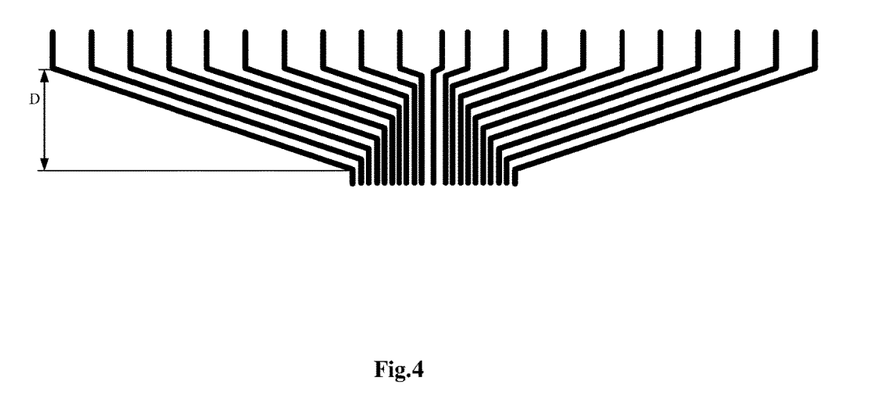
FIG. 4 is a schematic view illustrating arrangement of data connection lines in the prior art.
Figure 5:
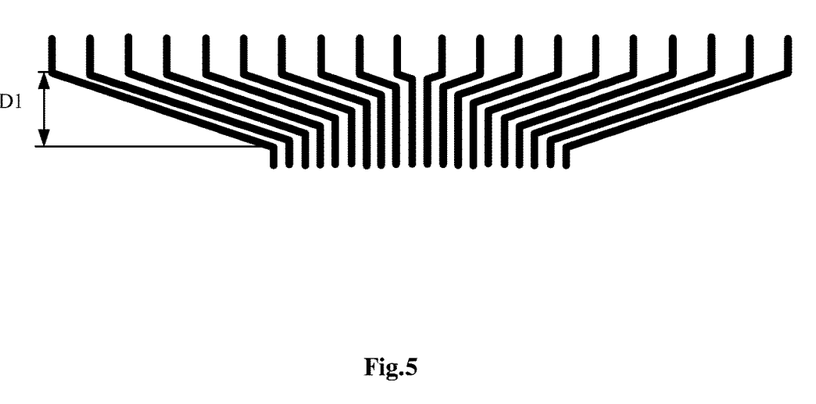
FIG. 5 is a schematic view illustrating arrangement of data connection lines provided by an exemplary embodiment of the application.

For facilitating the influence of the data connection lines provided by exemplary embodiments of the application onto the bezel, referring to FIG. 4 and FIG. 5, the number of the data connection lines as illustrated in FIG. 4 is larger than the number of the data connection lines as illustrated in FIG. 5. And since a data connection line has a certain width, under the influence of preparation processes, when data connection lines of the same cycle period become larger in terms of number, as illustrated in FIG. 4, in the vicinity of the control unit 40, there is an intensive arrangement of the data connection lines such that the interval spaces among neighboring data connection lines become even smaller; and due to the convergence of the data connection lines from the side edge of the touch display panel 10 towards the data pins 42 on the control unit 40, hereby, the data connection lines occupy larger space D between the touch display panel 10 and the control unit 40. In contrast, when the number of the data connection lines is smaller, as illustrated in FIG. 5, in the vicinity of the control unit 40, the interval spaces among neighboring data connection lines become larger; and due to the convergence of the data connection lines from the side edge of the touch display panel 10 towards the data pins 42 on the control unit 40, hereby, the data connection lines occupy smaller space D1 between the touch display panel 10 and the control unit 40. As illustrated, both of D and D1 are linear distances occupied by the data connection lines between the touch display panel 10 and the control unit 40, respectively.

As can be known from the principle as illustrated in FIG. 4 and FIG. 5, in the touch display device provided by this exemplary embodiment, the data connection lines are arranged in two layers, which fact may be considered as equivalent to "decreasing the number of data lines in each layer"; and in specific arrangement, the touch connection lines are arranged to be at least in the same layer in which one layer of the data connection lines are located, so as to reduce the number of data connection lines of each layer, such that the influence of the data connection lines onto the bezel width of the touch display device is decreased, without increasing the number of wiring layers.

The control unit 40 provided by this exemplary embodiment comprises a plurality of data pins 42 and a plurality of touch pins 41. And in specific arrangement, for example, the plurality of data pins 42 are located at a central position of the side edge of the control unit 40; correspondingly, by way of example, the plurality of touch pins 41 are divided into two groups of touch pins 41 which are distributed at both ends of the control unit 40, respectively.

For facilitating comprehension of the touch display device provided by the exemplary embodiment of the invention, a specific structure thereof will be described in details hereinafter, in view of FIG. 2 and FIG. 3.

Embodiment I

As illustrated in FIG. 2, a structure of a touch display device provided by the exemplary embodiment comprises a touch display panel 10 and a control unit 40 arranged on a side of the touch display panel 10, and a plurality of data connection lines and a plurality of touch connection lines are led out of a side edge of the touch display panel 10, the plurality of data connection lines being connected with the a plurality of data pins 42 on the control unit 40 in a one-to-one correspondence manner, while the plurality of touch connection lines being connected with a plurality of touch pins 41 on the control unit 40 in a one-to-one correspondence manner.

Proceeding to refer to FIG. 2, in the exemplary embodiment of the invention, there is provided only one first wiring area 30 between the touch display panel 10 and the control unit 40, and the data connection lines are arranged in two wiring layers within the first wiring area 30, the plurality of touch connection lines being arranged at least in the same layer in which one wiring layer of the data connection lines are located. In specific arrangement, a dimension of a side of the first wiring area 30 orientated in a direction perpendicular to the touch display panel 10 and towards the control unit 40 is defined as a length of the first wiring area 30, and the first wiring area 30 is larger than the control unit 40 but smaller than the side edge of the touch display panel 10 in terms of length.

In this exemplary embodiment, the data connection lines are divided to be arranged in two layers upon being led out of the touch display panel 10. In specific arrangement, the data connection lines are arranged in two layers upon being led out, and the plurality of touch connection lines are arranged in the same layer in which one wiring layer of the data connection lines are located, the data connection lines and touch connection lines arranged in the same layer being routed alternately. As a result, the influence of layering of the data connection lines onto production process of the touch display device may be decreased. And since the data connection lines and the touch connection lines are arranged in alternate wiring direction(s), the distance between neighboring lines of identical type may be increased.

By use of the aforementioned structure, since the number of the touch connection lines is relatively small, hereby, when the data connection lines and the touch connection lines are arranged in the same layer, their influence onto the bezel width is minimized.

Furthermore, in case that above connection way is adopted, the plurality of touch connection lines are firstly led into a position of the data pins 42 which are located at a central position of the side edge of the control unit 40, and in turn folded back from both sides after passing through the data pins 42 so as to be connected with corresponding touch pins 41 at both ends of the control unit 40. In other words, a portion of wirings are arranged on the control unit 40 such that the influence of wiring onto the bezel width is minimized.

By arranging data connection lines in a layering manner, and by arranging touch connection lines at least in the same layer in which one wiring layer of the data connection lines are located, the bezel width occupied by the data connection lines is reduced, and influence of the data lines onto the bezel width of the touch display device is in turn decreased, facilitating development of a slim bezel of the touch display device.

Embodiment II

As illustrated in FIG. 3, a structure of a touch display device provided by the exemplary embodiment comprises a touch display panel 10 and a control unit 40 arranged on a side of the touch display panel 10, and a plurality of data connection lines and a plurality of touch connection lines are led out of a side edge of the touch display panel 10, the plurality of data connection lines being connected with the a plurality of data pins 42 on the control unit 40 in a one-to-one correspondence manner, while the plurality of touch connection lines being connected with a plurality of touch pins 41 on the control unit 40 in a one-to-one correspondence manner.

Upon wiring/routing, the wiring area provided by this exemplary embodiment of the application comprises a first wiring area 30 and a second wiring area 20. To be specific, the second wiring area 20 and the first wiring area 30 being arranged sequentially in a direction directing from the touch display panel 10 towards the control unit 40; and the data connection lines are arranged in a single wiring layer within the second wiring area 20, and then arranged to be divided into two wiring layers at an intersection area between the first wiring area 30 and the second wiring area 20. In other words, the data connection lines are arranged to be in the form of a structure with two wiring layers within the first wiring area 30, while arranged in a single wiring layer within the second wiring area 20.

Specifically, in the above wring/routing structure, the second wiring area 20 provided by this exemplary embodiment is equivalent to a wiring area as illustrated in FIG. 4, while a wiring arrangement in the first wiring area 30 is equivalent to that illustrated in FIG. 5. With the wiring arrangement within the first wiring area 30, the influence of the data connection lines onto a wire bezel is effectively decreased, facilitating development of a slim bezel of the touch display device.

In specific wiring, the data connection lines provided by this exemplary embodiment of the invention have a wiring in two layers within the first wiring area 30, i.e., the data connection lines are arranged in two wiring layers; and in specific wiring, in the two wiring layers of the data connection lines, one wiring layer of the data connection lines are arranged in the same layer in which the touch connection lines are located, such that the data connection lines which are routed/wired in a layering manner minimize their influence onto production processes of the touch display device.

Alternatively, as a specific embodiment, within the second wiring area 20, the touch connection lines are arranged in a single wiring layer which is different from the wiring layer of the plurality of data connection lines.

By way of example, alternatively or additionally, within the first wiring area 30, the touch connection lines are arranged in two wiring layers, each of the two wiring layers of the touch connection lines being arranged in the same layer in which a corresponding layer of the two wiring layers of the data connection lines are located, respectively. In other words, the data connection lines are arranged in two wiring layers within the first wiring area 30, while the touch connection lines are also arranged in two wiring layers within the first wiring area 30, one wiring layer of the data connection lines being arranged in the same layer in which corresponding one wiring layer of the touch connection lines are located; i.e., in one wiring layer, there are both data connection lines and touch connection lines. In a more specific solution, the data connection lines and touch connection lines arranged in the same layer are routed/wired alternately.

In a specific arrangement, the first wiring area 30 is larger than the control unit 40 but smaller than the side edge of touch display panel 10 in terms of length. In other words, the length of the first wiring area 30 is configured to be as long as possible, and the data connection lines are configured to be distributed more sparsely within the first wiring area 30, such that the influence of the data connection lines onto the bezel width is further decreased.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although the disclosure is described in view of the attached drawings, the embodiments disclosed in the drawings are only intended to illustrate the preferable embodiment of the present application exemplarily, and should not be deemed as a restriction thereof.

Various embodiments of the present application have been illustrated progressively, the same or similar parts of which can be referred to each other. The differences between each embodiment and the others are described in emphasis.

Although several exemplary embodiments of the general concept of the present application have been shown and described, it would be appreciated by those skilled in the art that various changes or modifications may be made in these embodiments without departing from the principles and spirit of the disclosure, the scope of which is defined in the claims and their equivalents.

It should be noted that the terms, such as "comprising", "including" or "having", should be understood as not excluding other elements or steps and the word "a" or "an" should be understood as not excluding plural of said elements or steps. Further, any reference number in claims should be understood as not limiting the scope of the present application.

LIST OF REFERENCE NUMERALS

1 touch display panel
2 touch connection line 3 control unit
4 data connection line
10 touch display panel
20 second wiring area
30 first wiring area
40 control unit
41 touch pin
42 data pin

What is claimed is:

1. A touch display device, comprising a touch display panel and a control unit arranged on a side of the touch display panel, a first wiring area being arranged between the touch display panel and the control unit;

wherein a plurality of data connection lines and a plurality of touch connection lines are led out of a side edge of the touch display panel, the plurality of data connection lines being connected with a plurality of data pins of the control unit in a one-to-one correspondence manner, the plurality of touch connection lines being connected with a plurality of touch pins of the control unit in a one-to-one correspondence manner;

wherein within the first wiring area, the plurality of data connection lines are arranged in two wiring layers, the plurality of touch connection lines being arranged at least in the same layer in which one wiring layer of the two wiring layers of the data connection lines is located;

wherein a dimension of a side of the first wiring area orientated in a direction perpendicular to the touch display panel and towards the control unit is defined as a length of the first wiring area, and the length of the first wiring area is larger than a length of the control unit and smaller than a length of the side edge of touch display panel; and wherein within the first wiring area, the plurality of touch connection lines are arranged in the same layer in which one wiring layer of the data connection lines is located, the data connection lines and touch connection lines arranged in the same layer being routed alternately.

2. The touch display device according to claim 1, wherein the plurality of touch connection lines are firstly led into a position where the data pins are located, then folded back to connect with corresponding touch pins after passing through the data pins.

3. The touch display device according to claim 1, wherein within the first wiring area, the plurality of touch connection lines are arranged in two wiring layers, each of the two wiring layers of the touch connection lines being arranged in the same layer in which a corresponding layer of the two wiring layers of the data connection lines is located, respectively.

4. The touch display device according to claim 2, wherein the data connection lines and touch connection lines arranged in the same layer are routed alternately.

5. The touch display device according to claim 3, further comprises a second wiring area, the second wiring area and the first wiring area being arranged in sequence in a direction from the touch display panel towards the control unit; wherein the data connection lines are arranged in a single wiring layer within the second wiring area and arranged in two wiring layers at an intersection area between the first and the second wiring areas.

6. The touch display device according to claim 5, wherein the plurality of touch connection lines are arranged in a single wiring layer within the second wiring area, and wherein the single wiring layer of touch connection lines is different from the single wiring layer of the data connection lines.

7. The touch display device according to claim 1, wherein the plurality of data pins of the control unit are located at a central position of a side edge of the control unit, the plurality of touch pins being divided into two groups which are distributed at two ends of the control unit, respectively.

* * * * *